Aug. 28, 1928.
A. SMITH
1,682,431
CHIP FINISHING MACHINE
Filed July 23, 1925　　5 Sheets-Sheet 3
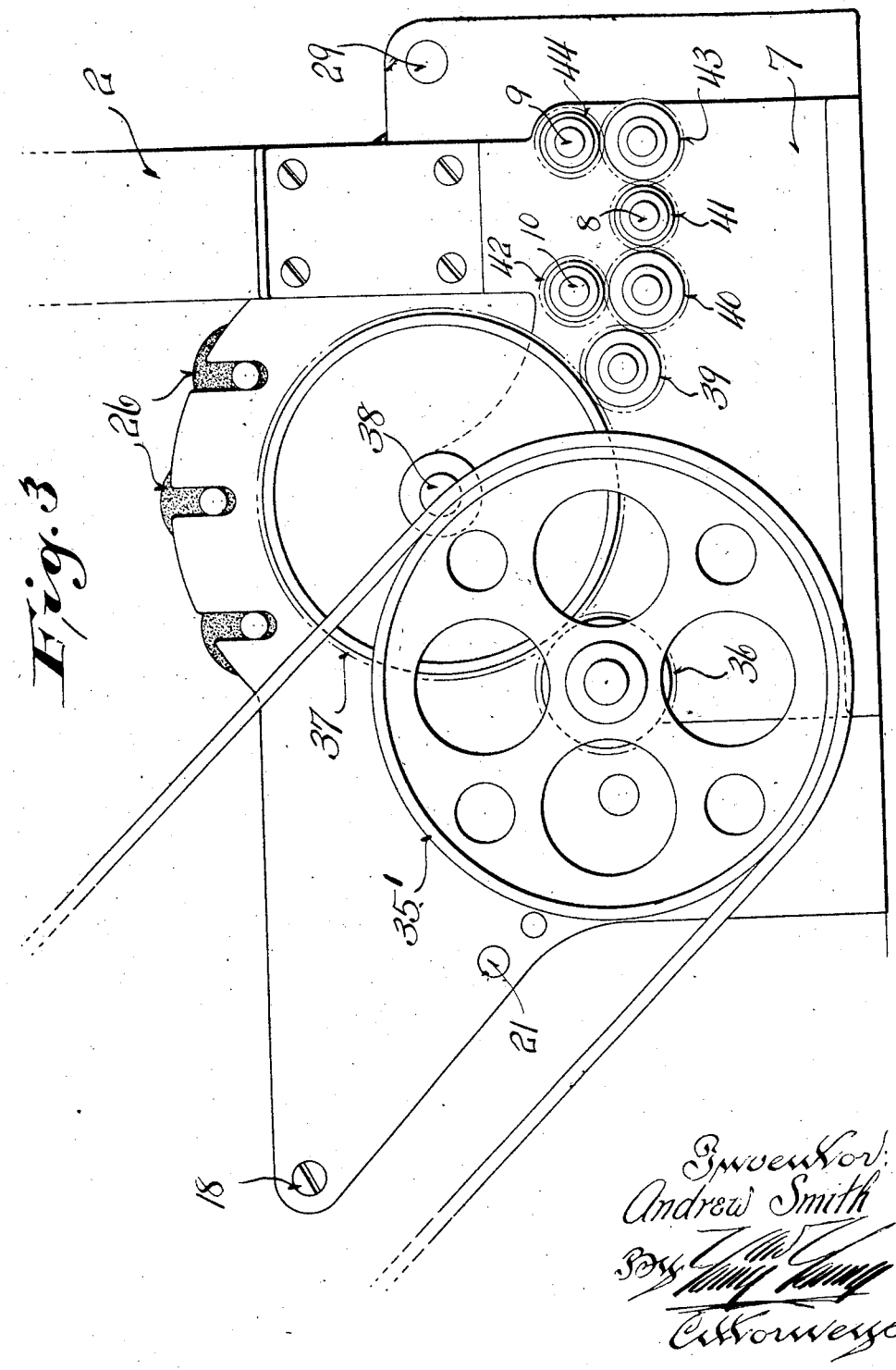

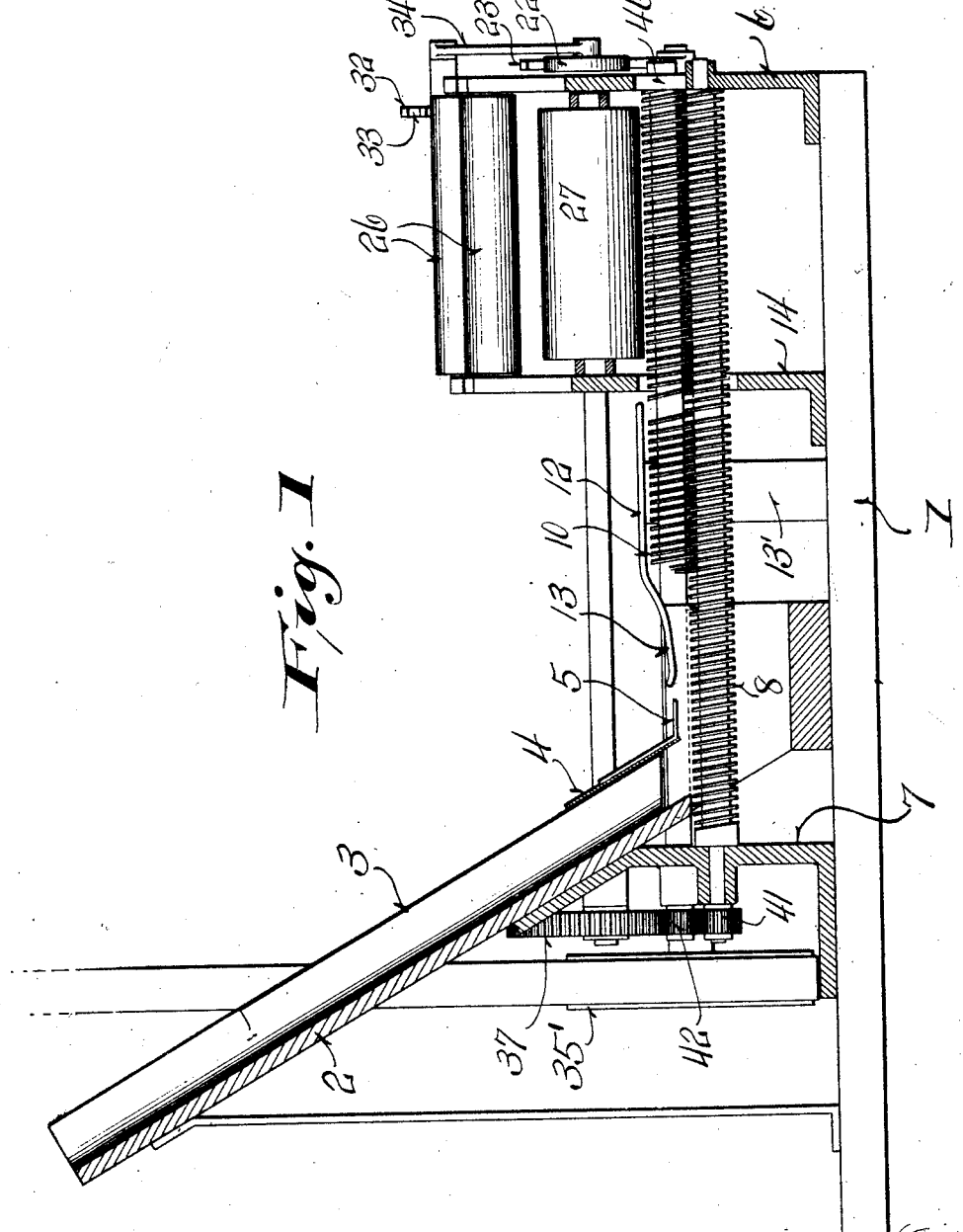

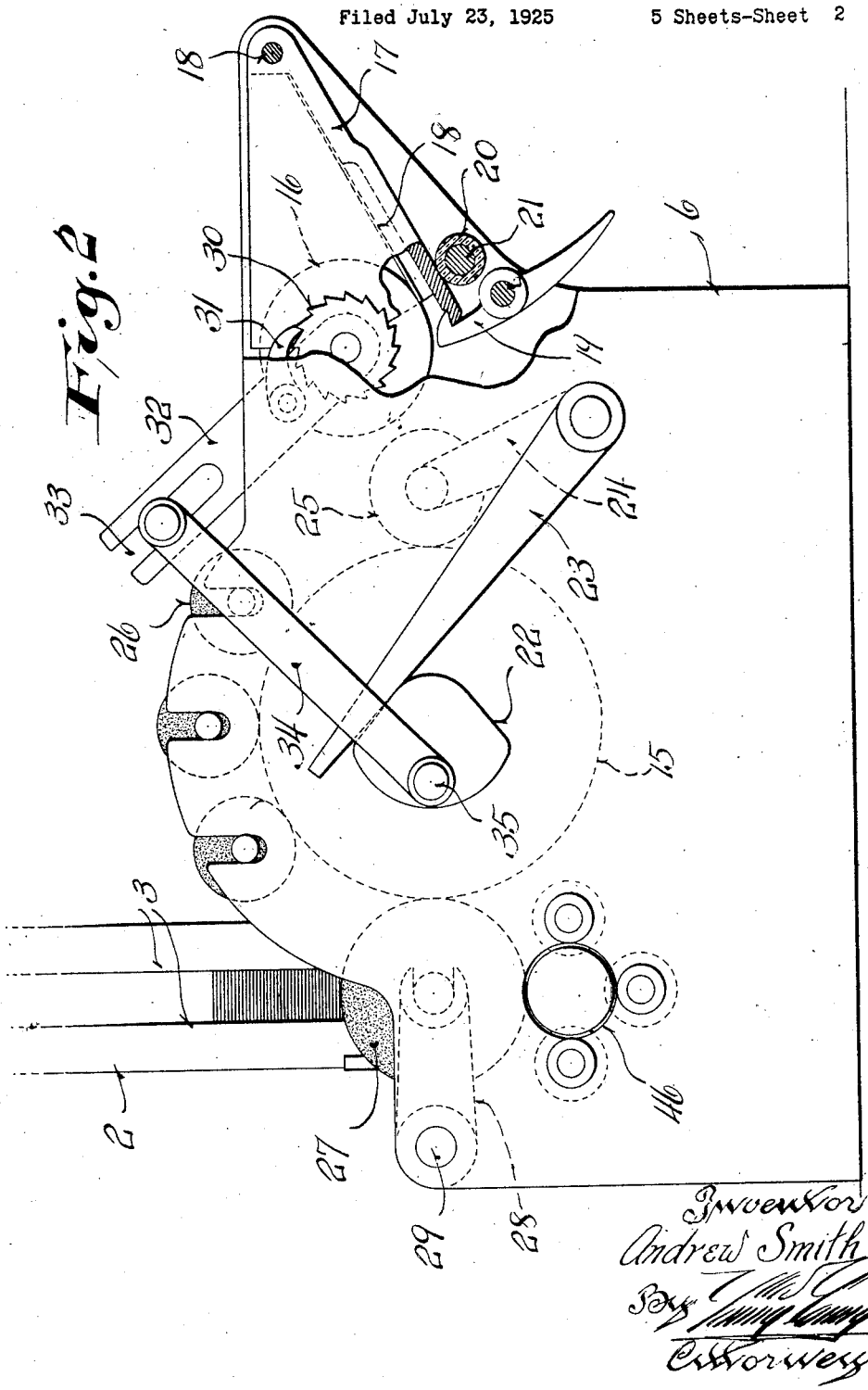

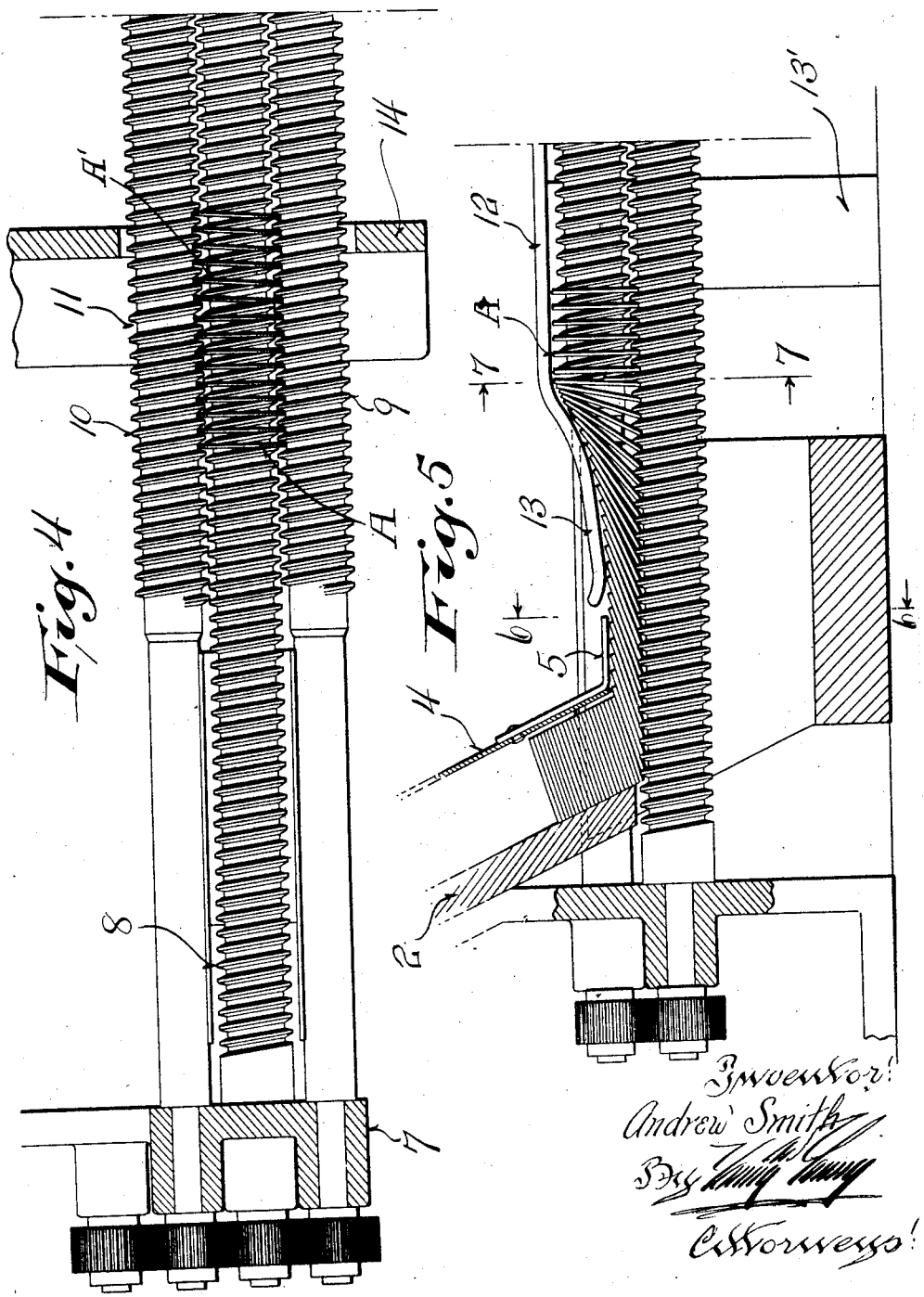

Aug. 28, 1928. 1,682,431
A. SMITH
CHIP FINISHING MACHINE
Filed July 23, 1925    5 Sheets-Sheet 5
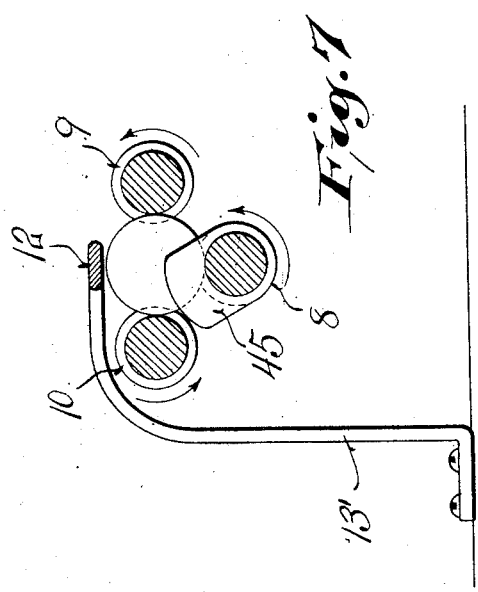
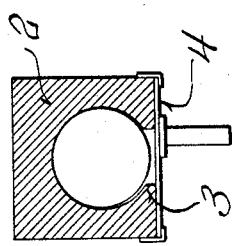
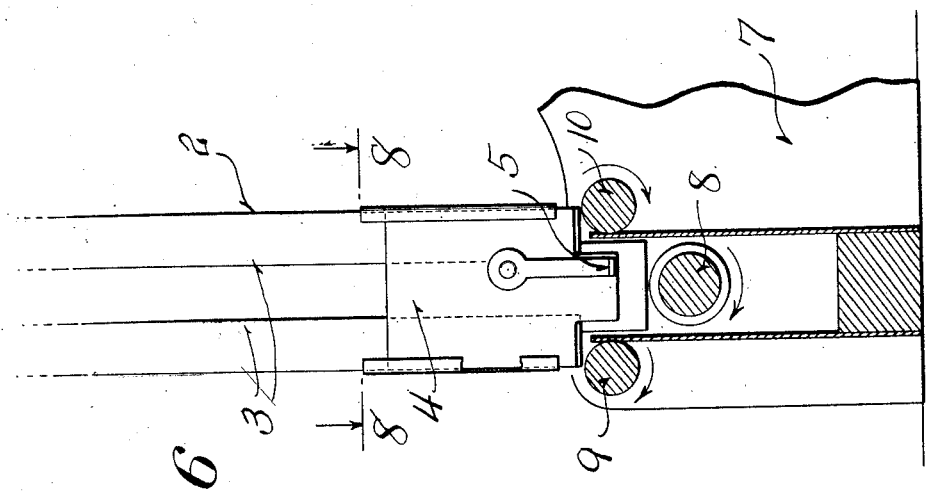
Inventor:
Andrew Smith Patented Aug. 28, 1928.

1,682,431

UNITED STATES PATENT OFFICE.

ANDREW SMITH, OF MILWAUKEE, WISCONSIN.

CHIP-FINISHING MACHINE.

Application filed July 23, 1925. Serial No. 45,615.

This invention relates to chip finishing machines.

Objects of this invention are to provide a machine for finishing chips, such for instance as poker chips, which will receive the chips as they are stamped, or otherwise formed, and will ink, paint, or enamel the edges of the chips in a very uniform and rapid manner, which will insure the complete relative travel of the inking means around the edge of the chip a large number of times before the chip passes from the machine, and which will simultaneously operate upon a large number of chips.

Further objects are to provide a machine which is wholly automatic and which is very rapid in operation.

Further objects are to provide a machine which will handle the chips although they may be made of somewhat yielding material, without damage to the chips in any manner, and which will automatically remove the chips from the stack in a hopper and present them edgewise in the correct manner to an inking instrumentality.

An embodiment of the invention is shown in the accompanying drawings, in which:

Figure 1 is a longitudinal, sectional view through the machine.

Figure 2 is a front elevation of the machine.

Figure 3 is a rear view thereof.

Figure 4 is a plan view partly in section of the advancing and manipulating screws which handle the chips.

Figure 5 is a vertical, sectional view of the structure shown in Figure 4.

Figure 6 is a sectional view on the line 6—6 of Figure 5.

Figure 7 is a sectional view on the line 7—7 of Figure 5.

Figure 8 is an enlarged sectional view through the hopper, taken on the line 8—8 of Figure 6.

Referring to the drawings, it will be seen that the machine is provided with a bed plate 1 which supports an inclined hopper 2 provided with a rounded channel throughout its extent. Preferably this hopper has inwardly turned edges 3, as indicated in Figures 1 and 8, which partially close the channel towards the lower end of the hopper. Further, a slide 4 is suitably guided in ways carried by the hopper and extends downwardly to the position shown in Figure 1. This slide or plate carries an outwardly projecting finger 5 extending towards the front of the machine for a purpose hereinafter to appear.

A further view of this plate and finger is given in Figure 5, from which it will be seen that the chips pass the lower edge of the plate 4 singly as they are advanced by mechanism hereinafter described.

The machine is provided with end standards 6 and 7 between which a plurality of advancing screws are positioned. These screws comprise a bottom screw 8 of uniform pitch throughout, a side screw 9 also of uniform pitch throughout, although of lesser extent than screw 8, as shown most clearly in Figure 4. Further, a third screw 10 is provided which has at the portion indicated at 11 a change in pitch causing a sudden advance of the chips at this portion.

A cam-like guiding finger 12 is carried by an upright 13' secured to the base and projects over the center screw 8. It is provided with a forwardly downwardly extending portion 13. An intermediate standard 14 is provided and a main transfer roller 15 is mounted between these standards. Further, an inking roller 16 is carried between the standards in an inking trough 17, such trough being preferably provided with a thin plate bottom 18 contacting with the roller 16. This trough-like member 17 is carried by means of a bolt 18' passing between the standards and is held downwardly by means of a latch 19, such latch forcing the member 17 against the rubber sheath 20 of a transverse bolt 21 and holding the member 17 securely in position. The roller 15 carries a cam 22 which cooperates with a cam follower or lever 23, such lever being in turn rigidly attached to the lever 24. The lever 24 carries a roller 25 which is oscillated back and forth between the inking roller 16 and the main roller 15.

A plurality of spreading rollers 26 are provided which fit within slots in the standards, as indicated particularly in Figures 2 and 3. These rollers smooth out or even the ink on the roller 15 prior to its reaching the inking roller 27. The rollers 15 and 16 are preferably of metal, while rollers 25, 26, and 27 are preferably rubber, or otherwise of yielding material. Further, it is to be noted that the inking roller 27 is carried in arms 28 pivotally mounted upon a shaft 29.

It is to be noted further from Figure 2 that the inking roller 16 is advanced in a step by step manner, to properly feed the ink, by means of a ratchet wheel 30 and a pawl 31 and such pawl being pivotally carried by means of a lever 32. The lever 32 is slotted, as indicated at 33, and adjustably receives a link 34. The outer end of the link 34 fits the crank pin 35 rigidly carried by the cam 22. Thus an oscillatory motion is imparted to the link 34 and lever 32 and the step by step feeding of the supply roller 16 results.

The drive for the machine may be of any suitable type. For instance, as shown in Figure 1, a driven pulley 35' is rigidly attached to a small gear 36 (see Figure 3) which meshes with a larger gear 37 carried by the shaft 38 of the roller 15 (see Figures 2 and 3.) The gear 37 meshes with an idler 39 which in turn meshes in a second idler 40. The idler 40 is interposed between a gear 41 on the worm 8 and a gear 42 on the worm 10. An idler 43 connects the gear 41 with a gear 44 carried by the worm 9.

From Figure 6 the relative motion of the worms 8, 9 and 10 are indicated by the arrows and it will be seen that they all revolve in the same direction. It is to be noted, also, from Figure 7 that the worm 8 is provided with a separator finger or member 45 which, as may be seen from Figure 7, is at the beginning of the worms 9 and 10 for a purpose to appear hereinafter.

The operation of the machine is as follows: The chips are first positioned upon the worms so that they are supported between the worms 9 and 10 and rest upon the worm 8, as shown in Figure 5, and a stack of chips are positioned in the hopper 2. When the worms rotate in the direction of the arrows shown in Figures 6 and 7, they advance the chips it being noted that the worm 8 removes a single chip at a time from the hopper 2, and that these chips slide below the lower edge of the plate 4 and are guided by the fingers 5 and 12, the extension 13 of the fingers 12 approximately alining with the finger 5. It is to be noted that the separator member or finger 45 of the worm 8 separates the chips and insures the entrance of a single chip at a time between the screw threads of the worms 9 and 10, as shown most clearly in Figures 5, 6, and 7. Further, the shape of the finger 12 and its extension 13 insures the proper cooperation with the worms.

It is to be noted from Figures 4 and 5 that the chips are substantially vertical, as indicated at A as they enter between the worms 9 and 10. However, the increase of pitch, indicated at 11 in Figure 4, causes the chips to assume the transversely slanting position, as shown and indicated at A' in said figure. The chips when in this position pass beneath the inking roller 27 and the roller 27 rotates at such a speed as to aid in rotating the chips in addition to the aid afforded by the worms 8, 9, and 10. Further, the transversely slanting position of the chips at A' at the time when they contact with the inking roller 27, causes the chips to advance in exact accordance with the pitch of the screw threads when such chips roll upon the under side of the inking roller 27. This prevents warping or binding of the chips and insures a very smooth operation of the machine.

It is to be noted particularly that the chips rotate a large number of times before they are passed from beneath the inking roller 27. After they have passed this roller and have their edges thoroughly inked, they pass through the opening 46 (see Figure 2) in the front standard 6 of the machine.

Thus the chips are very rapidly inked and pass in a single manner beneath the inking roller and are insured of having their edges completely covered.

It will be seen further that a machine for finishing the chips has been provided, which will operate upon the chips although they may be made of easily deformed material, which will handle the chips singly and yet will operate upon a large number of chips simultaneously, thus insuring a large output for the machine.

It is to be distinctly understood that the term "inking" as employed in the specification and claims, is to cover any finishing of the edges of the chips, whether painting, enameling, inking, or otherwise treating and coating them. This term, therefore, is used to avoid needless repetition in the claims.

Although the invention has been described in considerable detail, it is to be understood that the same may be variously embodied and is therefore to be limited only as claimed.

I claim:—

1. A chip finishing machine comprising a hopper for receiving the chips, feeding means for withdrawing chips from the hopper, and an inking member for inking the edge of the chips, said inking member and said feeding means both being rotary and jointly rotating said chips, whereby the entire peripheral edge of each chip passes said inking member and is thoroughly coated.

2. A chip finishing machine comprising a hopper for holding a stack of chips, an elongated screw positioned below said hopper and adapted to withdraw chips singly from the bottom of said hopper, a guiding member positioned above said screw and cooperating therewith to gradually stand said chips on edge, additional screws cooperating with said first mentioned screw to rotate and advance said chips in a spaced manner while said chips are on edge, and an inking roller against which the peripheral edges of said chips are held while they are fed by said screws.

3. A chip finishing machine comprising a hopper for holding a stack of chips, an elongated screw positioned below said hopper and adapted to withdraw chips singly from the bottom of said hopper, a guiding member positioned above said screw and cooperating therewith to gradually stand said chips on edge, additional screws cooperating with said first mentioned screw to rotate and advance said chips in a spaced manner while said chips are on edge, and an inking roller against which the peripheral edges of said chips are held while they are fed by said screws, said roller being elongated and adapted to operate upon a plurality of spaced chips in a simultaneous manner.

4. A chip finishing machine comprising a hopper for holding a stack of chips, an elongated screw positioned below said hopper and adapted to withdraw chips singly from the bottom of said hopper, a guiding member positioned above said screw and cooperating therewith to gradually stand said chips on edge, additional screws cooperating with said first mentioned screw to rotate and advance said chips in a spaced manner while said chips are on edge, an inking roller against which the peripheral edges of said chips are held while they are fed by said screws, and a separating finger carried by the first mentioned screw and adapted to separate said chips as they are being engaged by said last mentioned screws.

5. A chip finishing machine comprising a hopper for receiving a stack of chips, means for withdrawing said chips from said hopper and standing them on edge, means cooperating with said first mentioned means for setting said chips in an approximately vertical plane at an angle to the axis of the machine, and an inking roller cooperating with said means whereby said inking roller and said means cause said chips to trace a spiral with reference to the surface of said inking roller.

6. A chip finishing machine comprising a hopper for receiving the chips, means for advancing and rotating said chips, an inking roller contacting with the edges of said chips while they are being advanced, an enlarged roller contacting with said inking roller, ink supply means for feeding ink to said enlarged roller, and means cooperating with said enlarged roller for spreading the ink thereon in a uniform manner.

7. A chip finishing machine comprising a slanting hopper for receiving a stack of chips, an elongated screw positioned below the bottom edge of said hopper, a plate carried by said hopper adjacent its bottom end and below which said chips pass in a single manner, a guide positioned above said elongated screw, a pair of side screws adapted to engage the chips as they are fed by said elongated screw, a finger carried by said elongated screw for separating said chips and presenting them singly to said side screws, one of said side screws having an increase of pitch at one portion of its length to set said chips at an angle to their initial position, and an inking roller cooperating with said angularly set chips, said inking roller and said screws jointly rotating said chips whereby the peripheral edges of each of said chips are thoroughly inked by said inking roller.

8. A chip finishing machine comprising a hopper adapted to receive the chips, means for removing the chips from the hopper with the chips lying one upon the other while they are being removed, and means for thereafter turning said chips in a slanting position on edge, and an inking roller for inking the edge of the chips.

9. A chip finishing machine comprising a hopper adapted to receive the chips, means for removing the chips in a slanting position from said hopper with the chips lying one upon the other while they are being removed, and means for thereafter turning said chips on edge and rotating said chips while holding them on edge, and an inking roller for inking the edge of the chips.

10. A chip finishing machine comprising a hopper for holding a stack of chips, an elongated screw for withdrawing said chips singly from said hopper with the chips lying one upon the other while they are being removed, and means for thereafter standing said chips on edge, and an inking roller against which the edges of said chips are successively pressed.

11. A chip finishing machine comprising a hopper for holding a stack of chips, an elongated screw for withdrawing chips singly from said hopper with the chips lying one upon the other while they are being removed, and means for thereafter standing said chips on edge, and an inking roller against which the edges of said chips are successively pressed, said inking roller being elongated and adapted to simultaneously operate upon a plurality of chips.

In testimony that I claim the foregoing I have hereunto set my hand at Milwaukee, in the county of Milwaukee and State of Wisconsin.

ANDREW SMITH.